United States Patent [19]

Chi

[11] Patent Number: 4,960,342
[45] Date of Patent: Oct. 2, 1990

[54] COUPLING FOR SECURING A HANDLEBAR TO A BICYCLE FRAME

[76] Inventor: Yi-Chen Chi, No. 139-5, An Mei Rd., Mei Shan Tsun; Hou Li Hsian, Taichung Hsien, Taiwan

[21] Appl. No.: 493,760

[22] Filed: Mar. 15, 1990

[51] Int. Cl.$^5$ ............................................. F16B 1/00
[52] U.S. Cl. ...................................... 403/24; 403/320; 403/288; 411/303; 280/279
[58] Field of Search ................... 403/288, 320, 24; 411/303, 369; 280/279, 280

[56] References Cited

U.S. PATENT DOCUMENTS 4,282,913  8/1981  Trimmer .......................... 411/303

FOREIGN PATENT DOCUMENTS 588373  1/1925  France ............................. 280/279
1273757  9/1961  France ............................. 280/279

Primary Examiner—Andrew V. Kundrat
Attorney, Agent, or Firm—Connolly and Hutz

[57] ABSTRACT

A coupling for securing a handlebar to a bicycle frame, the coupling includes a compression nut and a bowl. An inner thread is formed in an upper end of the compression nut. A sealing ring has an outer thread formed on a lower end. The sealing ring is secured in place by a threaded engagement between the sealing ring and the compression nut when the handlebar standpipe is inserted through the sealing ring into the compression nut.

3 Claims, 3 Drawing Sheets

COUPLING FOR SECURING A HANDLEBAR TO A BICYCLE FRAME

BACKGROUND OF THE INVENTION

The present invention relates to a coupling, and more particularly to a coupling for securing a handlebar to a bicycle frame.

As shown in FIG. 4, a conventional coupling for securing a handlebar to a bicycle frame comprises a washer W provided between a compression nut N and a bowl B, and a ball bearing A disposed in a bowl B. In order to maintain a good operational capability for the bearing A and to avoid a permeation of water into the bearing A, a sealing ring S is provided in an upper portion of the compression nut N. The sealing ring S has generally an O shaped cross section or a rectangular cross section. The sealing ring S is disposed in a groove formed in the compression nut N without support before a standpipe P can be inserted downward into the compression nut N.

The inner diameter of the sealing ring S is smaller than an outer diameter of a standpipe P so as to make a water tight seal between the standpipe P and the compression nut N. Obviously, the standpipe P contacts and hits the sealing ring S before it can be inserted into the compression nut N. This causes problems during assembling processes. It may take several times for an assembler to insert the standpipe P into the compression nut N so that the sealing ring S is retained in position.

The present invention has arisen to mitigate and/or obviate the afore-described disadvantages of the conventional sealing ring.

SUMMARY OF THE INVENTION

The primary objective of the present invention is to provide a coupling for securing a handlebar to a bicycle frame, in which a sealing ring is threadedly engaged to the upper end of a compression nut so that the sealing ring is secured in place when the standpipe passes through the sealing ring.

In accordance with one aspect of the invention, there is provided a coupling for securing a handlebar to a bicycle frame, the coupling includes a compression nut and a bowl. An inner thread is formed in an upper end of the compression nut. The sealing ring has an outer thread formed on a lower end thereof. An annular blunt wedge is formed in an upper and inner end of the sealing ring. A threaded engagement between the sealing ring and the compression nut helps the sealing ring to be secured in place when the standpipe is inserted through the sealing ring into the compression nut. The blunt wedge makes a water tight seal between the standpipe and the compression nut.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
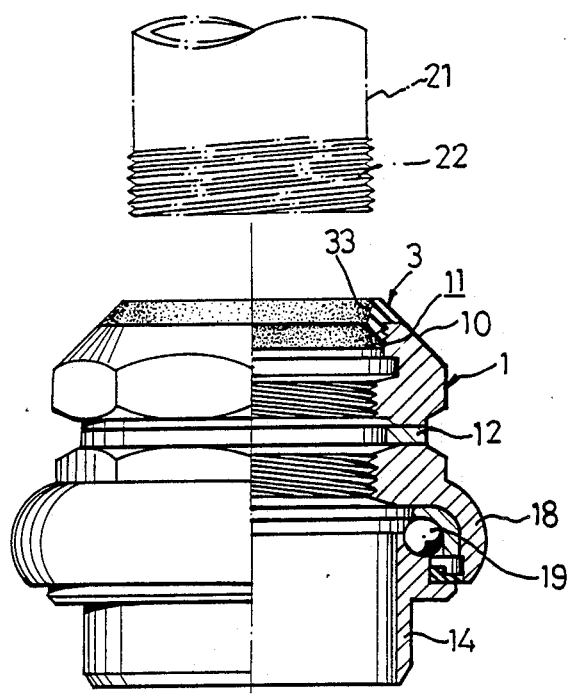
FIG. 1 is a partial cross sectional view of a coupling for securing a handlebar to a bicycle frame in accordance with the present invention.
Figure 2:
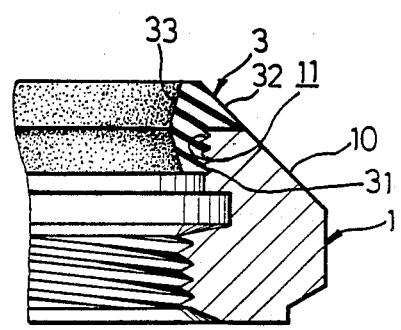
FIG. 2 is an enlarged partial cross sectional view of the coupling.

Referring to the drawings and initially to FIGS. 1 and 2, a coupling for securing a handlebar to a bicycle frame in accordance with the present invention comprises a washer 12 disposed between a compression nut 1 and a bowl 18. A bearing 19 is disposed between the bowl 18 and an upper end of a frame fork 14. An inclined surface 10 is formed on an upper and outer surface of the compression nut 1. An inner thread 11 is formed in an upper end of the compression nut 1. An external thread 22 is formed on a lower end of the standpipe 21.

The sealing ring 3 has an outer thread 31 formed on a lower end thereof. The outer thread 31 of the sealing ring 3 is threadedly engaged with the inner thread 11 of the compression nut 1. A first annular flange 32 which has a cross-section similar to a sharp wedge is formed on an upper and outer surface of the sealing ring 3. An upper surface of the first annular flange 32 of the sealing ring 3 has a slope equal to that of the inclined surface 10 of the compression nut 1 and is aligned with the inclined surface 10 so that water is guided to flow downward along the upper surface of the first annular flange 32 of the sealing ring 3 and the inclined surface 10 of the compression nut 1. A lower surface of the first annular flange 32 is level and contacts an upper surface of the compression nut 1. A second annular flange 33 which is generally shaped as a blunt angled wedge is formed on inner surface of the sealing ring 3. The inner diameter of the root portion of the second annular flange 33 of the sealing ring 3 is substantially equal to the outer diameter of the standpipe 21; and the inner diameter of the tip portion of the second annular flange 33 is slightly less than the outer diameter of the standpipe 21.

Figure 3:
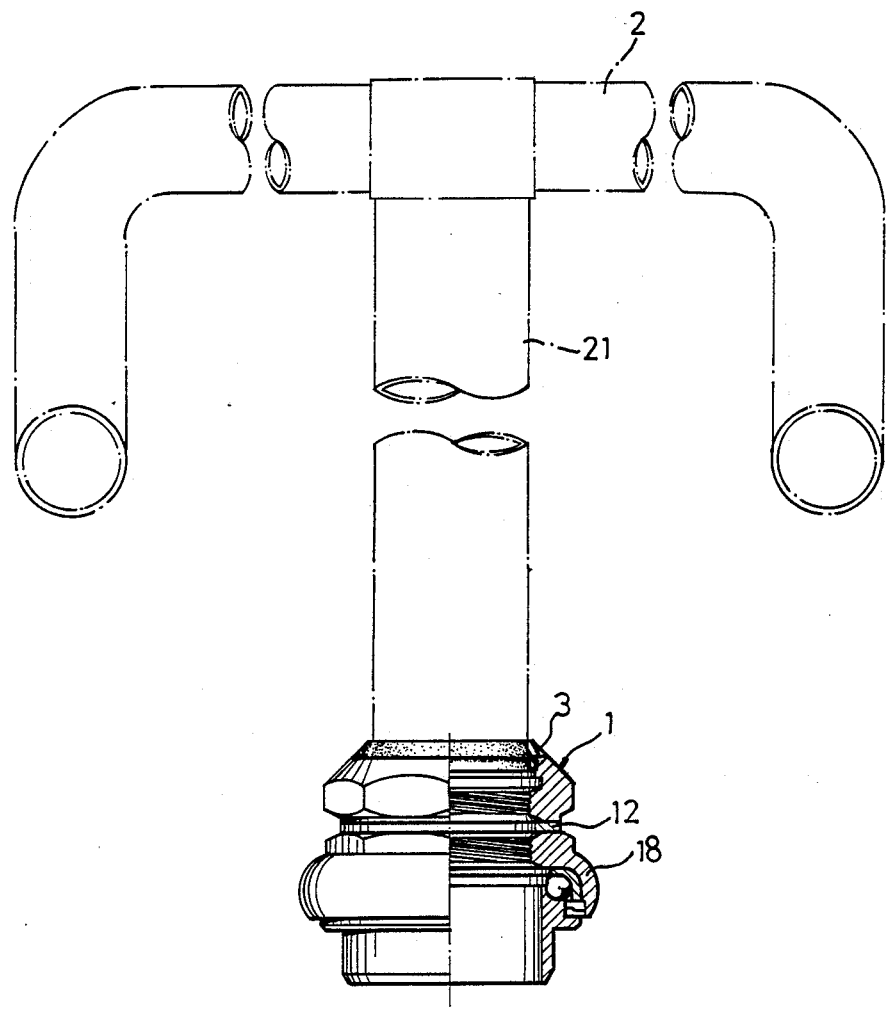
FIG. 3 is a partial cross sectional view of the coupling of the bicycle frame, in which the handlebar standpipe is shown in dotted lines.
Figure 4:
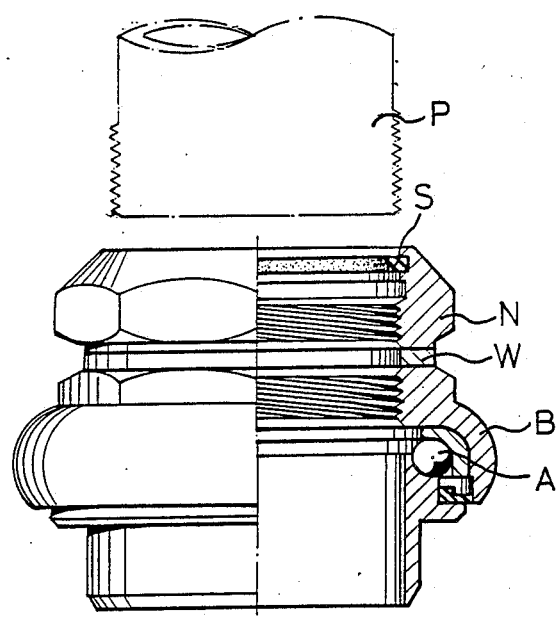
FIG. 4 is a partial cross sectional view of a conventional coupling of a bicycle.

Referring next to FIG. 3, a handlebar 2 is disposed on an upper end of the standpipe 21. When the standpipe 21 is inserted into the compression nut 1, the lower end of the standpipe 21 first passes through the second annular flange 33 of the sealing ring 3, then, the external thread 22 of the standpipe 21 is threadedly engaged with the lower inner thread of the compression nut 1. After the lower end of the standpipe 21 is threadedly engaged with the inner thread of the bowl 18, the compression nut 1 is rotated to compress the bowl 18 so that the standpipe 21 is solidly retained in place by the bowl 18 and the compression nut 1. The standpipe 21 is freely rotatable relative to the frame fork 14 with the assistance of the bearing 19. A threaded engagement between the outer thread 31 of the sealing ring 3 and the inner thread 11 of the compression nut 1 assures that the sealing ring 3 will not be separated from the compression nut 1 when the standpipe 21 is inserted into the compression nut 1. The second annular flange 33 of the sealing ring 3 makes a water tight seal between the standpipe 21 and the compression nut 1. The external thread 22 of the standpipe 21 has a length substantially equal to a length of the lower inner thread of the compression nut 1 plus the inner thread of the bowl 18 and a height of the washer 12 so that the sealing ring 3 substantially embraces a smooth outer surface of the standpipe 21.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A coupling for securing a handlebar to a bicycle frame that carries a compression nut through which a handlebar standpipe is received, characterized in that said compression nut has an inner thread formed in an upper end thereof and a sealing ring is fitted to said upper end of said compression so as to seal against said received standpipe, said sealing ring also has an outer thread formed on a lower end thereof, said outer thread of said sealing ring is threadedly engaged with said inner thread of said compression nut so as to secure said sealing ring in place.

2. A coupling according to claim 1, wherein an inclined surface is formed on an upper and outer surface of said compression nut, a first annular flange which has a cross-section similar to a sharp angled wedge is formed on an upper and outer surface of said sealing ring, an upper surface of said first annular flange has a slope substantially equal to that of said inclined surface of said compression nut and is aligned with said inclined surface so that water is guided to flow downward along said upper surface of said first annular flange of said sealing ring and said inclined surface of said compression nut, a lower surface of said first annular flange is substantially level and contacts and bears an upper surface of said compression nut.

3. A coupling according to claim 2, wherein a second annular flange which is generally shaped as a blunt angled wedge is formed on an inner surface of said sealing ring, an inner diameter of a root portion of said second annular flange is substantially equal to an outer diameter of said standpipe, and an inner diameter of a tip portion of said second annular flange is slightly less than said outer diameter of said standpipe so that said second annular flange makes a water seal between said standpipe and said compression nut.

* * * * *